United States Patent [19]

Vuong et al.

[11] Patent Number: 5,484,554
[45] Date of Patent: Jan. 16, 1996

[54] OXIDANT INJECTION FOR IMPROVED CONTROLLED OXIDATION

[75] Inventors: Dinh-Cuong Vuong, Nederland, Tex.; Donald D. Brooker, Junction, N.Y.; James S. Falsetti, New Fairfield, Conn.; James K. Wolfenbarger, Torrance, Calif.

[73] Assignee: Texaco Inc., White Plains, N.Y.

[21] Appl. No.: 290,218

[22] Filed: Aug. 15, 1994

Related U.S. Application Data

[63] Continuation-in-part of Ser. No. 6,028, Jan. 15, 1993, Pat. No. 5,338,489.

[51] Int. Cl.$^6$ .................................. C01B 3/22; C01B 3/24
[52] U.S. Cl. ............................................................ 252/373
[58] Field of Search ............................................. 252/373

[56] References Cited

U.S. PATENT DOCUMENTS

| | | | |
|---|---|---|---|
| 4,525,176 | 6/1985 | Koug et al. | 48/197 R |
| 4,851,152 | 7/1989 | Najjar | 252/373 |
| 4,952,380 | 8/1990 | Najjar et al. | 252/373 |
| 4,988,368 | 1/1991 | Crenwelg et al. | 252/373 |
| 5,112,366 | 5/1992 | Liu | 252/373 |
| 5,338,489 | 8/1994 | Jung et al. | 252/373 |

*Primary Examiner*—Werren B. Lone
*Attorney, Agent, or Firm*—Kenneth R. Priem; George J. Darsa; Henry H. Gibson

[57] ABSTRACT

A selective deslagging operation is conducted in a partial oxidation reactor wherein a first predetermined portion of the reactor is selectively deslagged by derivatization while limiting derivatizing slag conditions in a second predetermined portion of the reactor. Selective deslagging can be accomplished by controlled oxidation conditions in the reactor that vary from one predetermined portion of the reactor to another. Thus, the slag present in one predetermined portion is derivatized and fluidized for removal from the reactor at a faster rate than the slag present in another portion of the reactor, which is not derivatized or is subjected to more limited derivatizing slag conditions. Derivatized slag can be differentiated from non-derivatized slag that does not flow or more limited derivatized slag that has a lower mass flow rate then the derivatized slag at conditions of controlled oxidation. The derivatized slag can then be selectively removed because it has attained a lower fluidizing temperature.

14 Claims, 3 Drawing Sheets

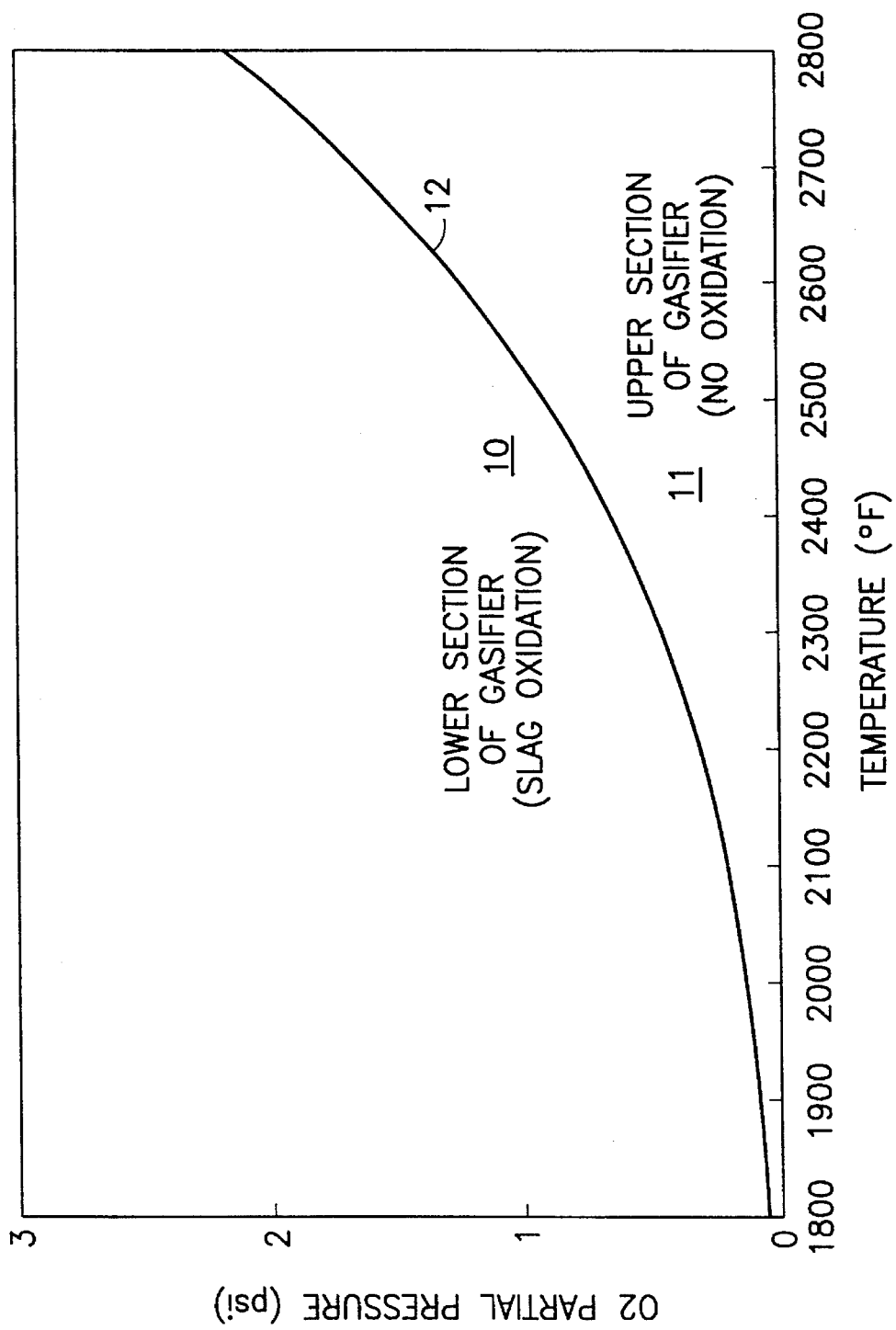

OXIDANT INJECTION FOR IMPROVED CONTROLLED OXIDATION

CONTINUING DATA

This application is a continuation-in-part of U.S. patent application Ser. No. 08/006,028, filed Jan. 15, 1993, U.S. Pat. No. 5,338,489, which is incorporated by reference herein in its entirety.

BACKGROUND OF THE INVENTION

1. Field of the Invention

This invention concerns selectively deslagging partial oxidation reactors.

2. Description of Related Information

Petroleum, coal and other organic natural resources are used to make fuels, such as for transportation, heating and power generation, as well as feedstocks to make materials which go into most manufactured goods, including clothes, food, cars, buildings and other merchandise. Diminishing resources have led to increasing use of organic feedstocks generally, and particularly in the United States, which are of lower grade and from more impure sources, such as heavier and poorer quality crude oil. These impure feedstocks need to be refined, or upgraded, more than lighter petroleum to make products having acceptable properties. A common upgrading process, called coking, recovers valuable hydrocarbon products from residual oils or other low grade petroleum products. Coking produces carbonaceous by-products called coke. Coke, residual oils and by-products made from heavy crude oil are generally impure containing relatively high levels of contaminants such as sulfur and various metals like vanadium, nickel and iron.

Unlike high purity grade coke which can be used to make electrodes, impure coke has little value due to the contaminants. Impure coke, as well as other carbonaceous materials containing metal contaminants can, however, be used as feedstock for partial oxidation reactions producing mixtures of hydrogen and carbon monoxide gases, called synthesis gas, or simply syngas. Syngas is a feedstock for making a host of useful organic compounds or can be used as a clean fuel to produce power in an environmentally sound way.

Partial oxidation of impure coke or other contaminated materials produces slag by-product which collects on the inside surface of the partial oxidation reactor. The slag deposits build up in the reactor or outlet to a level which prevents effective partial oxidation requiring shutdown to remove slag, called deslagging, from the partial oxidation reactor.

Slag deposition can be avoided by adding materials which prevent solid slag deposition, such as fluxing agents, which prevent slag solidification, or washing agents, which help carry slag from the reactor. These additives prevent slag build-up generally by mixing with the metal contaminants to prevent slag formation or its ability to build up deposits in the reactor. The use of these additives can be disadvantageous by increasing the amount of solid by-product of the partial oxidation reaction and by lowering by-product recovery value by diluting the concentration of valuable slag components, such as vanadium. The additives can also adversely impact the partial oxidation reaction, such as by reducing reaction efficiency. The use of such additives is described, for example, in U.S. Pat. No. 4,952,380 (Najjar et al.) and the patents therein listed.

Deslagging is limited by the nature of the slag and other components or aspects of the partial oxidation reactor. Due to the high melting point of the solid slag, it cannot be removed simply by heating it until it melts since reactor materials generally cannot withstand such high temperatures. Slag which can be derivatized to another form having a lower melting or subliming point provides an opportunity for slag removal. However, merely derivatizing the slag and heating the reactor to make fluid, derivatized slag will generally produce derivatized slag which solidifies in and blocks the reactor outlet, thereby requiring slag removal by mechanical means. Alternatively, U.S. Pat. No. 4,525,176 (Koog et al.) describes a deslagging technique using a movable burner assembly to control slag removal and avoid blocking the reactor outlet.

Deslagging can also damage the reactor. Refractory used to insulate the reactor vessel can be corroded, eroded or otherwise attacked by molten slag, and particularly derivatized slag such as pentavalent vanadates. Damaged or lost refractory needs to be replaced and requires reactor shutdown.

SUMMARY OF THE INVENTION

This invention concerns a selective deslagging operation in a partial oxidation reactor wherein a first predetermined portion of the reactor is selectively deslagged by derivatization while limiting derivatizing slag conditions in a second predetermined portion of the reactor. Selective deslagging can be accomplished by controlled oxidation conditions in the reactor that vary from one predetermined portion of the reactor to another. Thus, the slag present in one predetermined portion is derivatized and fluidized for removal from the reactor at a faster rate than the slag present in another portion of the reactor, which is not derivatized or is subjected to more limited derivatizing slag conditions. Derivatized slag can be differentiated from non-derivatized slag that does not flow or more limited derivatized slag that has a lower mass flow rate then the derivatized slag at conditions of controlled oxidation. The derivatized slag can then be selectively removed because it has attained a lower fluidizing temperature.

BRIEF DESCRIPTION OF THE DRAWINGS

In the accompanying drawings:

FIG. 3 shows the minimum oxygen partial pressure required to convert $V_2O_3$ to $V_2O_5$;

DETAILED DESCRIPTION OF THE INVENTION

Partial oxidation reactions generally involve reacting organic compounds with oxygen ($O_2$) under conditions which favor the formation of partially, as opposed to fully, oxidized material. Partial oxidation can be used to make syngas, which is a mixture of hydrogen ($H_2$) and carbon monoxide (CO).

The partial oxidation feedstock is one or more materials containing hydrogen and carbon. Generally, the feedstock is one or more organic compounds which provide a source of hydrogen and carbon for the partial oxidation reaction. Fluid hydrocarbonaceous fuel, meaning a composition comprised of one or more compounds of hydrogen and carbon in a fluid state, can be used as feedstock. The fluid can be either gaseous, liquid or fluidized solid.

Other materials may optionally be added to the gasification feedstock or process. Any suitable, including known, additives may be provided, such as fluxing or washing agents, temperature moderators, stabilizers, viscosity reducing agents, purging agents, inert gases or other useful materials.

Any effective, including known, reactor design can be used. Typically, a vertical, cylindrically shaped, steel pressure vessel can be used. Illustrative reactors and related apparatus are disclosed in U.S. Pat. No. 2,809,104 (Strasser et al.), U.S. Pat. No. 2,818,326 (Eastman et al.), U.S. Pat. No. 3,544,291 (Schlinger et al.), U.S. Pat. No. 4,637,823 (Dach), U.S. Pat. No. 4,653,677 (Peters et al.), U.S. Pat. No. 4,872,886 (Henley et al.), U.S. Pat. No. 4,456,546 (Van der Berg), U.S. Pat. No. 4,671,806 (Stil et al.), U.S. Pat. No. 4,760,667 (Eckstein et al.), U.S. Pat. No. 4,146,370 (van Herwijnen et al.), U.S. Pat. No. 4,823,741 (Davis et al.), U.S. Pat. No. 4,889,540 (Segerstrom et al.), U.S. Pat. No. 4,959,080 (Sternling), and U.S. Pat. No. 4,979,964 (Sternling). The reaction zone preferably comprises a downflowing, free-flow, refractory-lined chamber with a centrally located inlet at the top and an axially aligned outlet in the bottom.

Figure 1:
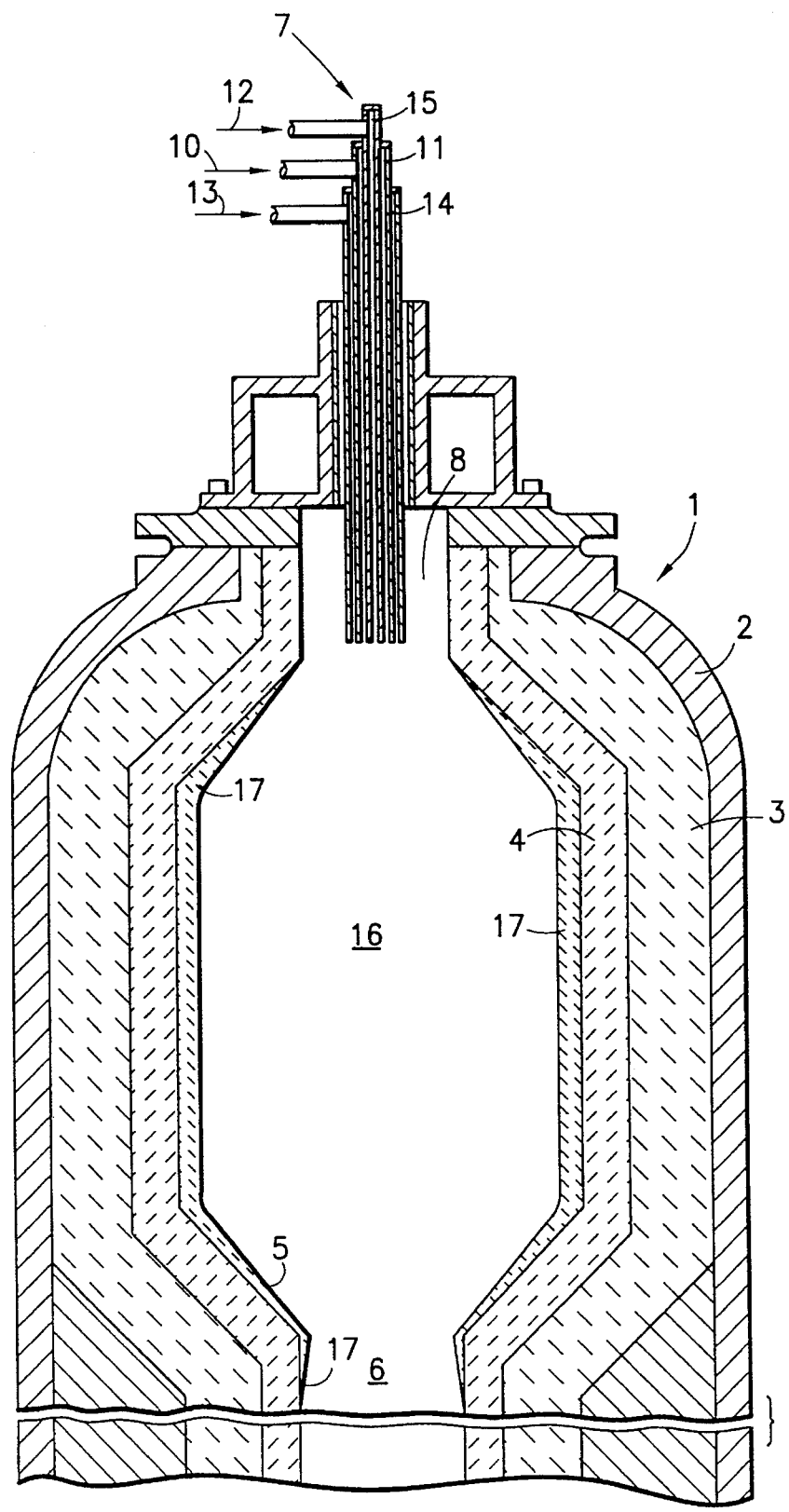
FIG. 1 is a cross section of a partial oxidation reactor.

Partial oxidation can be conducted using an apparatus as shown in FIG. 1, wherein a partial oxidation reactor 1 is made of a cylindrically shaped steel pressure vessel 2 lined with refractories 3 and 4. The bottom refractory 5 slopes to throat outlet 6. Burner 7 passes through inlet 8 at the top of the reactor 1. The reactor is also equipped with a pyrometer and thermocouples, not shown, to monitor reactor temperature at the top, middle and bottom of the reaction chamber. For partial oxidation, feedstock is fed through line 10 to an inner annular passage 11 in burner 7. Free-oxygen-containing gas is fed through lines 12 and 13 to central and outer annular passages 14 and 15, respectively. The partial oxidation reaction is conducted at temperatures of from about 1200° C. to about 1500° C. and at pressures of from about 10 to about 200 atmospheres. The feedstock reacts with the gas in reaction chamber 16 making synthesis gas and byproducts including slag which accumulates on the inside surface 17 of the reactor 1 and outlet 6. Synthesis gas and fluid byproducts leave the reactor through outlet 6 to enter a cooling chamber or vessel, not shown, for further processing and recovery.

The product stream leaving the reactor contains non-gaseous by-products, which vary in amount and type depending upon the feedstock composition. The non-gaseous by-product is typically particulates, generally carbon and inorganic ash. Much of the non-gaseous by-product is entrained in the product stream and carried out of the reactor. Some of the non-gaseous by-product contacts the inside surfaces of the reactor and may stick to the surface as slag. Slag is essentially fused mineral matter, i.e. ash, by-product of the slag-depositing material in the feedstock. Slag may also contain carbon, such as soot.

The product stream leaving the reaction zone is generally cooled to a suitable temperature to assist product stream processing and handling. The product stream can be cooled directly such as by quenching, and/or indirectly, by radiant or convective cooling.

In direct cooling by quenching, the product gas is cooled in a quench vessel, preferably located directly below the reactor vessel, generally by bubbling the product stream through aqueous liquid, commonly referred to as quench water, in the quench vessel. In indirect cooling, the product stream leaves the reaction zone and enters a radiant or convective cooler, such as through a heat exchange surface made up of a series of connected tubes containing water or steam.

Slag composition will vary depending on the type of slag-depositing material in the feedstock, reaction conditions and other factors influencing slag deposition. Typically, slag is made of oxides and sulfides of slagging elements. For example, slag made from impure coke or resid usually contains siliceous material, like glass and crystalline structures such as wollastinite, gehlenite and anorthite; vanadium oxide, generally in a reduced state like the trivalent vanadium trioxide ($V_2O_3$); spinel, such as having a composition represented by the formula $AB_2O_4$ wherein A is iron and magnesium and B is aluminum, vanadium and chromium; sulfides of iron and/or nickel; and metallic iron and nickel. Slag having a melting point below the temperature in the reactor, can melt and flow out the reactor, such as through outlet located at the bottom of the reactor, as molten slag.

Slag having a higher melting point than the temperature in the reactor, generally builds up as a solid in the reactor, typically on the surfaces of the refractory lining the reactor. Slag deposits increase as the reaction proceeds. The rate that slag collects can vary widely depending on the concentration of slag-depositing metal in the feedstock, reaction conditions, use of washing agents, reactor configuration and size, or other factors influencing slag collection. The amount of slag builds to a level where slag removal is desired. Although slag removal can be conducted at any time, the partial oxidation reaction is typically conducted as long as possible to maximize syngas production.

When deslagging is desired, the partial oxidation reaction is stopped in any effective way, typically by stopping feedstock addition. Before deslagging, it may be desirable to remove product gas left in the reactor. This may be done by any effective means such as by pumping out, i.e. depressurizing, the reactor or, preferably, by purging, i.e. flushing out, the reactor with an inert gas like nitrogen or steam. Deslagging can be done at any time, such as immediately or after any period of time, following the partial oxidation reaction. For example, before or after deslagging the reactor can be inspected, repaired, or serviced, or other operations performed, such as exchanging burners, pretreating slag, adjusting reactor temperature, or any other desired activity.

Deslagging is based on derivatizing at least part of the deposited slag from a solid metal or compound having a high melting point to a molten derivative having a lower melting point. The kind of deslagging derivatization, i.e. reaction, that occurs varies depending upon the slag composition. The deslagging process takes advantage of slag component properties. Slag, formed from the slagging components in the feedstock, generally contains metal or metal compounds in a reduced state, due to the highly reducing conditions under which slag is formed during the partial oxidation reaction. Typical slag deposits have, among others, one or more of the following: oxides and sulfides of transition metals, particularly Group VB, VIB and VIIB metals like vanadium, chromium, manganese, niobium, molybdenum, tantalum and tungsten, generally in a reduced, typically di-, tri- or tetra-valent, state, such as vanadium trioxide ($V_2O_3$), chromium sesquioxide ($Cr_2O_3$), manganese oxide ($Mn_3O_4$), tantalum trioxide ($Ta_2O_3$), tungsten dioxide ($WO_2$) or disulfide ($WS_2$), and the like.

The slag is derivatized, meaning the slag undergoes a chemical reaction with a derivatizing agent, to produce derivatized slag, meaning chemical derivatives which are the reaction product of slag with the derivatizing agent. Derivatizing agents differ from other slag treating agents, such as washing or other agents which physically or chemically complex or combine with the slag to wash7or flux it from the reactor. The derivatizing agent chemically combines, i.e. reacts, with slag elements to produce chemical derivatives having lower fluidizing points. Representative slag and corresponding derivatized slag, along with melting temperatures, are given in Table 1.

TABLE 1

| Slag Species and Melting Temperature | | | |
|---|---|---|---|
| Original Slag | Melting Temperature (°C.) | Derivatized Slag | Melting Temperature (°C.) |
| $V_2O_3$ | 1,970 | $V_2O_5$ | 690 |
| $Mo_2O_3$ | — | $MoO_3$ | 795 |
| $Cr_2O_3$ | 2,266 | $K_2CrO_4$ | 968 |
| $WO_2$ | 1,500–1,800 | $Na_2WO_4$ | 698 |
| MnO | — | $MnCl_2$ | 650 |
| Pd | 1,552 | PdO | 870 |

The derivatizing agent is any material which reacts with the slag to form derivatized slag having a lower melting point. Typically since the slag is in a reduced form, the derivatizing agent can be an oxidant which reacts with the slag to produce oxidized slag having a lower melting point than the original slag. Oxidized slag is typically metal oxide having a higher oxidation level than the form of the metal in the original slag. The derivatizing agent can be a combination of materials, such as oxidant and alkali metal or halide, which both react with the slag to form slag derivatives having lower melting points. Typical derivatizing agents include, among others, one or mixtures of the following: oxidants, such as free-oxygen-containing gas as described previously for the partial oxidation reaction, or a material which can provide free-oxygen-containing gas, such as carbon dioxide; haliding agent such as reactive components containing chlorine, fluorine, or bromine, like HCl and $Cl_2$; and similar materials. A preferred derivatizing agent is oxygen ($O_2$).

The temperature in the reactor during deslagging is adjusted to melt the derivatized slag. The reactor temperature is therefore generally kept above the melting point of the derivatized slag. This minimum temperature can vary depending upon the particular type of derivatized slag or other conditions, such as pressure or slag composition, which influence melting of the derivatized slag. The reactor temperature is generally above about 300° C., preferably from about 700° C. to about 1,600° C. and most preferably from about 900° C. to about 1,500° C. The pressure in the reactor during deslagging may be similar to or less than, such as atmospheric, that provided during partial oxidation as noted previously.

Heat can be provided to the reactor by any effective means. Generally, heat can be produced within the reactor by burning fuel in the reactor. Alternatively, heat can be generated externally and supplied directly or indirectly, such as by convection or adding hot gases, like combustion products or heated inert gas, to heat the reactor. Typically, fuel and oxidant are added and heat is produced by combusting, i.e. burning, the fuel. When the derivatizing agent is oxidant, the concentration of derivatizing agent in the reactor can be provided by adding more oxidant than is consumed by fuel combustion. The excess oxidant is then available for slag conversion.

The fuel for adjusting the temperature during deslagging can be any material effective at producing heat upon combustion to provide the temperature necessary for deslagging. Typical fuels include, among others, one or mixtures of the following: fluid hydrocarbonaceous fuel or solid carbonaceous material as described previously for the partial oxidation reaction; and similar materials. Preferred fuels include light hydrocarbons, like methane, propane, naphtha, or similar materials. To avoid complicating deslagging conditions, the fuel is preferably a clean burning material, such as natural gas, propane or methane or other material producing gaseous products which do not interfere with deslagging.

Other materials may optionally be included or supplied to the reactor during deslagging. Any desired, including known, additives may be used, such as one or more diluent, washing agent, fluxing agent, neutralizing agent or other useful material. Typical diluents include temperature moderators as previously described for the partial oxidation reaction. Typical washing or fluxing agents include those described previously for the partial oxidation reaction. Neutralizing agents can be added to adjust the pH or acidity of the quench water used to quench the hot syngas and slag, such as to reduce the corrosiveness of the quench water on the quench chamber components and during slag recovery. Typical neutralizing agents include bases, such as sodium hydroxide, potassium hydroxide, calcium hydroxide, calcium carbonate, ammonia, ammonium hydroxide, or the like.

Adding derivatizing agent and adjusting the reactor temperature without adequately considering factors influencing deslagging will not produce effective deslagging. Unless carefully prevented, melted slag will flow to the reactor outlet faster than slag can pass through the outlet and thereby fill the outlet. If the outlet is filled with slag, heat loss at the outlet can cause the slag, including derivatized slag, in the outlet to solidify thereby blocking the outlet. Solid slag blocking the outlet would generally require removal by mechanical means, causing an expensive, complete and lengthy reactor shutdown.

Heat loss at the reactor outlet occurs by radiation and direct contact with cooler temperatures outside the reaction chamber. Typically, the reactor outlet leads to a cooling chamber, such as a quench chamber or radiant cooler. The amount of heat applied to the reactor outlet has to at least equal the heat loss, otherwise the outlet temperature will drop. If the outlet temperature is below the melting point of the derivatized slag, the slag in the outlet will solidify in and plug the outlet. The reactor outlet temperature must be high enough for melted slag to pass through and not solidify in the outlet. The outlet temperature can be controlled by any effective means such as by insulating or other heat loss reducing means, by applying heat by any means, such as a continuous flow of hot gas through the outlet.

The levels of derivatizing agent and temperature in the reactor are carefully regulated during deslagging. The level of derivatizing agent in the reactor is any amount effective at derivatizing the slag and controlling the amount of fluidized slag so that the outlet does not become filled with slag. The amount of derivatizing agent can vary depending upon the kind of derivatizing agent or slag, temperature, reactor configuration, outlet heat loss, or other factors influencing the amount or rate of deslagging.

The concentration of derivatizing agent can be given in terms of the partial pressure of fluid derivatizing agent in the reactor. Generally, the partial pressure of derivatizing agent which provides derivatized slag is dependent on temperature. For example, the minimum partial pressure of oxygen, $P_{O2}$, in atmospheres, which provides vanadium pentoxide as a function of temperature, T in degrees Kelvin, is given in Equation 1.

Log $P_{O2}$= –6658/T+2.859

Equation 1: $O_2$ Partial Pressure versus Temperature

A lower concentration of derivatizing agent is therefore needed to maintain slag in its derivatized stage at lower temperatures. The partial pressure of derivatizing agent can be gradually increased during deslagging and may range from initially 0 up to many atmospheres, at the end of deslagging, preferably from initially about 0 up to about 3, and most preferably from initially about 0 up to about 0.5 atmospheres. The concentration of derivatizing agent in the reactor can vary depending on the amount of other materials provided.

Derivatizing agent and fuel can be fed to the reactor by any effective means, such as through a burner used in the partial oxidation reaction. Preferably, the partial oxidation process burner is used in deslagging, although another burner, like a preheating burner for partial oxidation or specialized burner for deslagging, can be substituted in place of the process burner. The process burner can be purged, such as with an inert gas like nitrogen, and cleaned, such as with water feed, following partial oxidation.

The amount of fuel needed depends on the amount of heat loss, reactor geometry, operating conditions such as temperature and pressure, feed temperatures and composition, as well as slag composition and deposit location. The amount of fuel oxidant can be less than, equal to or greater than a stoichiometric amount for complete fuel combustion. When oxidant is used as derivatizing agent, the amount of oxidant exceeds the amount needed to burn the fuel during deslagging. When fuel is used, the molar amount of oxidant to fuel during deslagging is generally at least $\Theta$, meaning the molar amount of oxidant needed for stoichiometric combustion, preferably from about 1.0001 x$\Theta$ to about 40 x$\Theta$, and most preferably from about 1.01 x$\Theta$ to about 4 x$\Theta$.

The allowable range for $\Theta$ depends on the pressure during controlled oxidation. When the pressure is atmospheric, then $\Theta$ should vary from about 0.9 to 1.1. However, if the pressure is about 20 atmospheres, then $\Theta$ should vary from about 0.9 to 1.005. $\Theta$ as low as 0.0 can be used if the fuel is sufficiently reactive and if the flame temperature near the oxidant injection port does not damage the refractory.

Temperature during deslagging can vary within the reactor depending upon reaction conditions such as reactor configuration and materials, slag deposits, gas flow rate, or other factors effecting temperature variations. The temperature in the reactor may be lower at the inside surface than in the middle of the reaction chamber and decrease farther from the burner and flame or nearer the reactor outlet. The temperature at the inside surface is preferably less than the temperature that would produce significant loss of refractory. Typically, the temperature at the surface is less than about 1,600° C., and preferably from about 600° C. to about 1,500° C.

One method of controlling deslagging involves setting up a temperature gradient, meaning a range of temperatures, within the reactor. One kind of temperature gradient has a lower temperature at the outlet with temperature increasing farther away from the outlet. With a vertical, cylindrically shaped reactor having a burner near the top of the reactor and the outlet centered at the bottom of the reactor, the temperature gradient would be axial, meaning oriented along the axis of the reactor, in which temperature increases higher in the reactor and away from the bottom outlet. An axial temperature gradient takes advantage of the relationship in Equation 1, that lower temperatures provide derivatized slag formation at lower derivatizing agent concentrations in terms of partial pressure in the reactor, to control deslagging. By starting the deslagging with little or no derivatizing agent and gradually increasing derivatizing agent during deslagging, derivatized slag can be formed initially at or near the outlet and gradually form farther away from the outlet towards the higher temperature portion of the reactor. This technique can be effective at preventing slag from blocking the outlet during deslagging.

The deslagging process can be used to remove essentially all or any desired portion of slag deposits. Preferably, a maximum amount of slag is removed to maximize slag recovery and the duration of subsequent gasification processing before more deslagging is needed. In some gasification systems it may be desirable to retain a protective layer or deposit of slag on the reactor walls to extend refractory life and act as thermal insulation.

Derivatized slag which leaves the reactor can, and generally does, carry underivatized slag with it. The recovered slag product of deslagging can therefore have a composition similar to the original slag but wherein some or all of the slagging component or associated material is in the derivatized, such as oxidized, state. Typically, the recovered slag contains metals and/or metal compounds as found in, and derived from the slag deposits, such as previously described. The recovered slag will generally have a significant concentration of valuable metal, such as vanadium or other Group VB, VIB and VIIB metals, which can be purified and recovered using any effective means.

The slag leaving the reactor can be collected by any effective means. Deslagging can be repeated whenever slag deposits rebuild to where removal is desired.

After stopping the partial oxidation reaction such as by discontinuing charge addition, the reactor is generally purged with nitrogen, then supplied with oxidant. The amount of oxidant is initially less than stoichiometric until the desired deslagging temperature, of between about 900° C. to about 1200° C. is reached. Deslagging can be started by adding derivatizing agent, such as excess free-oxygen-containing gas, into the reactor. The excess oxygen reacts with the deposited slag to make derivatized slag having a lower melting point. The slag flows down the reactor surface and out of the reactor for further processing and recovery.

The derivatized slag fluidizes and flows down the walls to the lower throat and outlet of the reactor. Because the throat of the reactor and the reactor outlet can experience heat loss or operate at a temperature lower than the deslagging temperatures in the reactor, slag can solidify and accumulate in this region, thereby increasing the risk of obstruction or blockage at the reactor outlet. If the accumulated slag cannot be readily removed, controlled oxidation must stop, the reactor has to be cooled and the slag removed by physical means such as by chipping away and/or drilling away the solidified slag.

There often exists an uneven distribution of adherent slag in the reactor, for example on the upper walls or at the lower throat location. The amount and distribution of slag will generally be unknown if the reactor cannot be inspected prior to commencement of controlled oxidation, e.g., when the gasification burner is used as the controlled oxidation burner. During controlled oxidation, an uneven distribution of slag, when derivatized, can result in an excessive flow of the slag from the upper walls of the reactor to the throat, thereby creating a risk of throat blockage or obstruction.

It is therefore important to conduct controlled oxidation of the reactor in a manner such that a selective higher level of derivatization of the slag to a melted flowing condition occurs at a predetermined portion of the reactor to ensure that the reactor locations that are exposed to the greatest risk of obstruction or blockage from slag accumulation remain fee and open.

Selective slag removal can be accomplished by creating controlled oxidation conditions in a predetermined portion of the reactor where an undesirably excessive accumulation of slag exists, for example, at the lower throat. Thus, the slag that has accumulated at the throat area can be derivatized at an accelerated rate relative to the other portions of the reactor. The slag flows out of the reactor at a rate at which the throat or outlet of the reactor can be maintained in a substantially unobstructed condition. At the same time, the upper walls of the reactor can be selectively derivatized under more limited or non-derivatizing slag conditions relative to the lower throat area, as the situation demands, thereby ensuring that blockage or obstruction caused by excessive slag flow from the upper walls of the reactor to the throat or outlet portions of the reactor does not occur.

Deslagging the reactor at different rates by the controlled addition of derivatizing agents at selected predetermined locations or portions of the reactor can ensure a higher level of derivatization of the slag through oxidation. Therefore, increased mass flow rates of the slag at, for example, the lower throat portion of the reactor, minimize slag accumulations in the throat region and outlet portions. In this way, greater amounts of slag on the upper walls of the reactor can be deslagged at a low mass flow rate to minimize blockage or obstruction of the lower throat or outlet on the reactor.

Derivatizing agents can be supplied selectively to predetermined portions of the reactor to selectively produce zones or gradients of derivatization. This can be accomplished, for example, by injecting oxygen as the derivatizing agent through an opening into the reactor such as a pyrometer aperture located in the lower portion of the partial oxidation reactor as disclosed in U.S. Pat. No. 5,000,580 to Leininger et al, which is incorporated by reference herein.

The derivatizing agent injection port can be located several inches above the conical section of the reactor near the bottom to prevent recirculation of the oxygen containing gas derivatizing agent to upper portions of the reactor, and avoid blockage of the injection port by slag that accumulates in the lower conical section.

By locating the entry for such gas oxidant derivatizing agents at predetermined locations in the reactor, an oxidation gradient can be established so that the partial pressure of the gaseous derivatizing agent can be higher in one predetermined portion of the reactor than in another predetermined portion of the reactor, thereby providing selective derivatization and fluidization of slag.

As noted, the oxidation gradient can be established by selectively injecting the derivatizing agent in a lower, downstream portion of the reactor, while maintaining more limited or non-derivatizing conditions upward or upstream of the reactor. This can also be accomplished by establishing a competing reaction in the reactor that consumes the derivatizing agent in a predetermined portion of the reactor before it can derivatize the slag, while in another predetermined portion of the reactor the derivatizing agent becomes available for derivatization and fluidization. The competing reaction can be set up to ensure that the slag exists in a more limited or non-derivatized state.

FIG. 3 is an equilibrium oxygen partial pressure temperature diagram that shows the oxygen partial pressure necessary to convert $V_2O_3$ to $V_2O_5$ and the temperature parameters which enable the reactor to operate in two different regimes simultaneously.

In essence, by providing an oxygen partial pressure gradient with increased concentrations of derivatizing agent near the throat of the reactor while deslagging, the slag in proximity to the throat of the reactor maintains higher fluidity than the slag in the remaining portions of the reactor. This allows for a faster slag flow rate and removal at the throat portion of the reactor while simultaneously limiting slag fluidization in other predetermined portions of the reactor. The rapid removal of slag from the throat allows for more efficient and effective deslagging of the reactor.

In the examples which follow, all parts and percentages are by weight, unless otherwise stated.

EXAMPLE 1

No Oxidant Injection In Deslagging

A petroleum coke feedstock slurry for the preparation of syngas was prepared by passing coke through a magnetic separator to remove metal objects before being fed to a hammermill which crushes the coke. The crushed coke was passed to a rod mill where it was ground with water to produce an aqueous slurry. Coke slurry elemental analysis, ash content and gross heating value (GHV), determined following standard ASTM-D-3173, D-3174, D-3177, D-3178, D-3179, D-3286, D-3682 and D-3683 procedures, are given in Table 2.

TABLE 2

Coke and Coke Ash Analyses

| Coke Analysis: (in weight % of coke) | |
|---|---|
| Solids | 61.8–67.5% |
| Carbon | 86.9–87.9% |
| Hydrogen | 3–3.2% |
| Nitrogen | 1.8–2% |
| Sulfur | 4.54–4.63% |
| Ash | 0.83–1.13% |
| Calculated GHV | 14,099–14,235 Btu/lb |
| Ash Analysis: (in weight % of ash) | |
| Sodium | 5.7–11.9% |
| Magnesium | 0.2–0.8% |
| Aluminum | 1.1–4.7% |
| Silicon | 2.6–7.2% |
| Calcium | 1.8–5.6% |
| Titanium | 0.2–0.4% |
| Vanadium | 14.5–20.1% |
| Chromium | 0% |
| Iron | 1.3–3.3% |
| Nickel | 2.8–5.1% |
| Strontium | 0.02–0.06% |
| Molybdenum | 0.1–0.2% |
| Barium | 0.03–0.04% |
| Other (primarily O & S) | Balance |

The coke slurry was fed to a partial oxidation reactor as in FIG. 1, through an inner annular passage of the burner. Free-oxygen-containing gas, having greater than 95 volume % oxygen was fed through the center and outer annular passages of the burner.

The partial oxidation reaction was conducted using a procedure similar to that described in U.S. Pat. No. 3,620,698 (Schlinger), which is incorporated herein by reference, and the procedure as described for, and apparatus as shown in FIG. 1. After preheating the reactor, the feedstock was fed to the reactor and partial oxidation was conducted at temperatures, based on gas exit temperature, of from about 1,375° C. to about 1,430° C. and a pressure of about 600 psig.

After 10 days, the reaction was stopped by discontinuing feedstock and oxygen addition. The reactor was allowed to cool for several hours to a temperature of 1000° C. Approximately 2300 kg of vanadium rich slag accumulated fairly evenly and uniformly on the gasifier walls during the partial oxidation reaction. The process injector (not shown in FIG. 1) was replaced by a controlled oxidation burner (not shown in FIG. 1). Propane, air and nitrogen were introduced at 70° F. through the controlled oxidation burner to preheat the gasifier for four hours. The reactor was operated at atmospheric pressure. The flow rates were adjusted as shown in Table 3.

TABLE 3

Gas Flow Rates

| Time, (hrs:min) | Propane, *(Nm³/hr) | Air, (Nm³/hr) | Nitrogen, (Nm³/hr) | Reactor Temperature, (°C.) | Oxygen Pressure, (psia)** |
| --- | --- | --- | --- | --- | --- |
| 0:00 | 90 | 2070 | 0 | — | 0.0 |
| 1:45 | 90 | 2380 | 0 | — | 0.174 |
| 3:00 | 90 | 2885 | 0 | — | 0.63 |
| 6:45 | 91.5 | 3080 | 250 | 1260 | 0.64 |

*$Nm^3$ = normal meters
**psia = pounds per square inch absolute

A stream of nitrogen was injected through the controlled oxidation burner. Substantially all slag was removed from the gasifier vessel in approximately 5 hours. During deslagging, an intermittent buildup of slag stalactites was observed in the throat. At one point the build-up was significant, threatening termination of the controlled oxidation deslagging procedure.

Analysis of the slag after controlled oxidation was stopped showed that unoxidized vanadium was present. The unoxidized vanadium is believed to have increased the viscosity of the molten slag during controlled oxidation, thereby promoting the formation of stalactites in the throat. Because there was no oxidant injection, it was very difficult to remove the slag.

EXAMPLE 2

With Oxidant Infection In Deslagging

Propane, air and nitrogen are fed to the controlled oxidation burner (not shown) in the partial oxidation reactor of FIG. 1, as in Example 1, except that 250 $Nm^3$/hr of pure oxygen at 70° F. is injected through an oxidant injection port or nozzle at 6¾ hours in place of the nitrogen addition.

The oxygen partial pressure in the throat area increases to 1.72 psia. The temperature is largely unaffected. The higher oxygen partial pressure increases the rate of oxidation of the $V_2O_3$ to $V_2O_5$ in the slag near the throat. The increased rate of oxidation of the slag reduces the amount of unoxidized vanadium and thus lowers the viscosity of the slag. The formation of stalactites in the throat outlet is less severe and controlled oxidation proceeds with less risk of blockage.

EXAMPLE 3

Oxidant Injection

Figure 2:
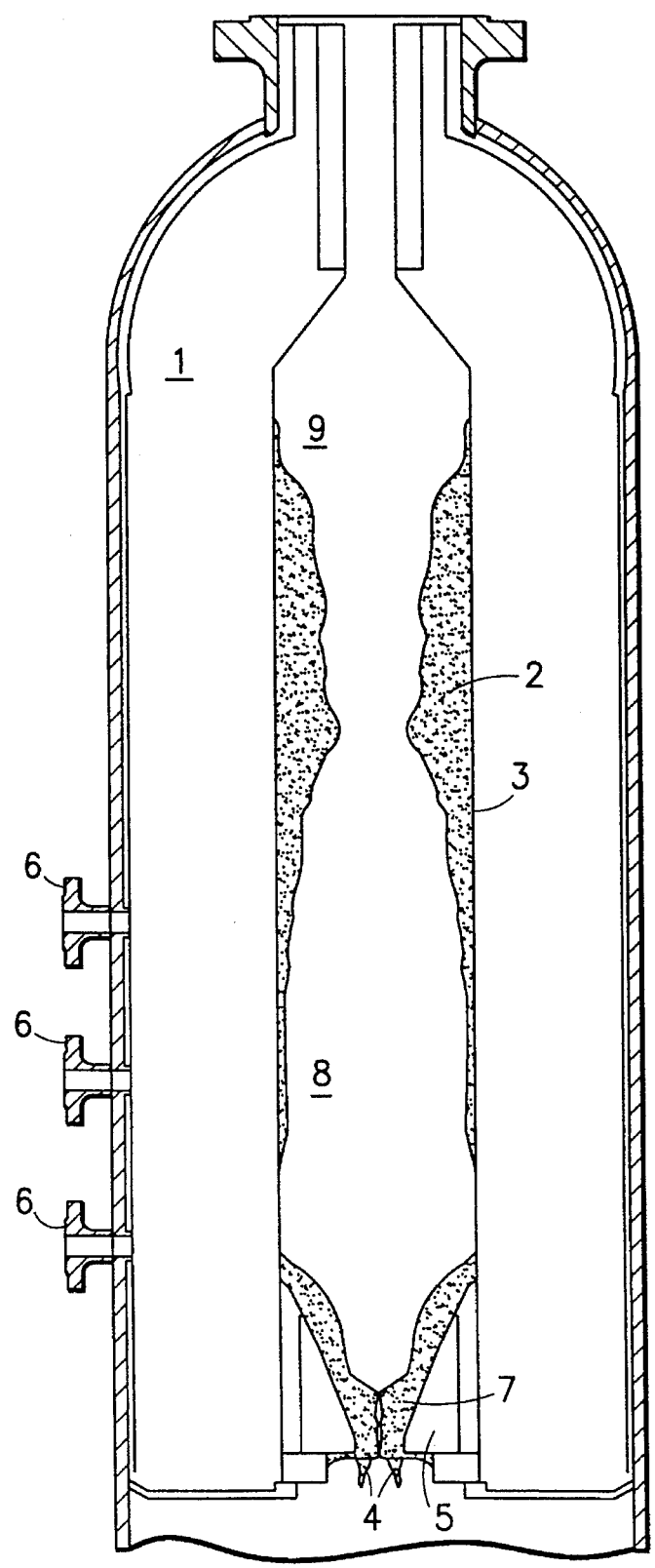
FIG. 2 is a cross section of a reactor showing the entry location for the selective derivatizing agent in accordance with the present invention.

Gasification of 100% petroleum coke under partial oxidation conditions in the partial oxidation reactor of FIG. 1 proceeds for seven days. As shown in FIG. 2, deposits of coke slag form on the reactor walls. Natural gas and air flow into the reactor through the process burner (not shown in FIG. 2) at rates of 600 standard cubic feet per hour ("SCFH") and 5430 SCFH, respectively. The air flow rate is slightly less than the amount needed for complete combustion of the natural gas. The partial oxidation reactor is operated at 190 psia. Heat loss from the reactor is 250,000 Btu/hr. Pure oxygen is introduced at 70° F. through the lower oxidant injection port 6 at a rate of 125 SCFH. The amount of oxygen that is injected through the lower oxidant injection port 6 is sufficient to convert both the residual CO and $H_2$ that flows down past the port 6 and the unconverted slag 7 that is below the oxidant injection port 6. The gas compositions and temperature above and below the oxidant injection port are shown in Table 4.

TABLE 4

| | Gasifier Conditions During Oxidant Injection | |
| --- | --- | --- |
| | Above $O_2$ Injection Port | Below $O_2$ Injection Port |
| Temperature, °F. | 2006 | 2200 |
| $O_2$ Pressure, psia | 0.04 | 2 |
| % CO | 1.4 | 0 |
| % $H_2$ | 0.6 | 0 |

Controlled oxidation proceeds in the lower section 8 of the reactor for three hours, during which time the slag 7 in the throat 5 and lower section 8 of the reactor are completely removed. Slag 2 in the upper section 9 of the reactor is unaffected during the three hour period of controlled oxidation occurring in the lower section 8 because the temperature is low and because the residual CO and $H_2$ consume all oxygen before it can diffuse to the upper section 9 of the reactor. After the three hour controlled oxidation treatment in the lower section 8 of the reactor, additional oxidant is injected into the process burner (not shown) so that the oxygen partial pressure in the upper section 9 of the reactor increases to 2 psia. Controlled oxidation proceeds in the upper section 9 with a completely open throat 5 because of the earlier selective derivatization of the slag 7 and its removal at throat 5.

EXAMPLE 4

Coke gasification is conducted in reactor 1 as shown in FIG. 2. During gasification and just prior to the start of controlled oxidation, the oxygen:coke mass ratio is reduced to increase the production of unconverted carbon. This period of reduced oxygen:coke operation can last for about ten minutes to about ten hours, and can continue for an even longer period of time if desired. The slag that is deposited on the walls of the reactor 1 during the period of lower oxygen:coke operation contains higher levels of carbon than the slag deposited during normal operation. At sufficiently lower oxygen:carbon mass ratios, for example less than 0.8, the unconverted carbon production will be high enough to build a thin layer of carbon particles on the surface of the slag 2. The carbon that forms on and in the slag 2 will consume oxygen during controlled oxidation and therefore reduce the rate of slag oxidation in the upper section 9 of the reactor in the event that small amounts of oxygen diffuse to the upper section 9.

Thus by preconditioning the slag prior to controlled oxidation, the controlled oxidation in the upper portion of the reactor will be suppressed, and the lower portion 8 which is exposed to larger amounts of oxygen will be selectively deslagged.

EXAMPLE 5

Gasification is conducted in the partial oxidation reactor 1, as shown in FIG. 2. During gasification, one or more metals that form metal sulfides, such as iron, are added to the fuel. These metal sulfides mix with the slag deposited on the reactor walls, and will oxidize during controlled oxidation, consuming oxygen. The metal sulfide oxidation reduces the rate of $V_2O_3$ oxidation in the slag in the upper section 9 of the reactor 1 while the slag 7 in the lower section 8 that is exposed to excess oxygen through oxidant injection port(s) 6 selectively oxidizes at a faster rate. Thus, by providing an additive to the fuel, the slag throughout the gasifier reactor resists oxidation when exposed to oxygen at low partial pressures, which would be present, for example, in the reactor above the oxidant injection port in Example 3.

EXAMPLE 6

The benefits of oxidant injection for a 20 ton/day gasifier reactor 1 that is represented diagrammatically in FIG. 2, are illustrated in FIG. 3, which represents a plot of data generated from Equation 1:

$$\text{Log } P_{o2} = -6658/T + 2.859$$

The interior of the reactor is coated with vanadium rich slag 2 and 7. The heat loss from the reactor is 250,000 Btu/hr. 750 SCFH of natural gas is injected through a controlled oxidation burner (not shown) at the top of the gasifier reactor 1, which is operated at a pressure of 200 psia. Air, which is employed as the oxidant, is cofed with the natural gas at a rate of 7225 SCFH. The excess oxygen consumes the natural gas. The calculated temperature in the upper portion 9 of the gasifier reactor is 2475° F., and the calculated oxygen partial pressure is 0.44 psia. As shown in FIG. 3 by the operating point 11 located below and to the right of the equilibrium curve 12, the oxygen partial pressure is insufficient to oxidize the $V_2O_3$ and liquefy the slag 2 in the upper portion 9 of the gasifier. Air at 70° F. is injected at a rate of 110 SCFH through an oxidant injection port 6 located in a lower portion 8 of the reactor 1, as shown in FIG. 2. The oxygen partial pressure in the lower section 8 of the reactor 1 increases to 1 psia, and the temperature is reduced to about 2420° F. As shown in FIG. 3, by the operating point 10 that is above and to the left of the equilibrium curve 12, the oxygen partial pressure is sufficient to oxidize the $V_2O_3$ in the lower section 8 of the reactor 1 so that the resulting $V_2O_5$ liquifies at the operating temperature.

What is claimed is:

1. In a process for removing slag from a partial oxidation reactor under conditions of controlled oxidation wherein derivatizing agent is provided to derivatize the slag at a temperature sufficient to fluidize the derivatized slag to flow out of said reactor, the improvement which comprises selectively derivatizing and fluidizing slag in a first predetermined portion of the reactor to enable slag removal at a first rate of flow, while limiting the derivatizing and fluidizing slag conditions in a second predetermined portion of the reactor, to enable slag to flow at a second rate of flow, thereby selectively controlling the amount of slag removal from said reactor.

2. The process of claim 1, wherein the first predetermined portion of the reactor is at the throat and the second predetermined portion of the reactor is at the upper walls.

3. The process of claim 1, wherein the slag in the first predetermined portion of the reactor is derivatized at a rate that is greater than the derivatization rate of the slag in the second predetermined portion of the reactor.

4. The process of claim 1 wherein the slag comprises a metal compound that is derivatized to a metal derivative having a lower melting point than the metal compound.

5. The process of claim 4 wherein the metal compound comprises trivalent vanadium compounds and the metal derivative comprises pentavalent vanadium compounds.

6. The process of claim 1 wherein the reactor temperature is above the melting point of the derivatized slag.

7. The process of claim 6 wherein the reactor temperature varies from about 700° C. to 1600° C.

8. The process of claim 1 wherein the reactor outlet temperature is greater than the derivatized slag fluidizing temperature.

9. The process of claim 1 wherein the concentration of derivatizing agent in the first predetermined portion of the reactor is greater than the concentration of derivatizing agent in the second predetermined portion of the reactor.

10. The process of claim 1, wherein the derivatizing agent is at least one selected from the group consisting of oxidants and a material that provides a free oxygen containing gas.

11. The process of claim 10, wherein the oxidant is at least one selected from the group consisting of oxygen and air.

12. The process of claim 10, wherein the material that provides a free oxygen containing gas is $H_2O_2$.

13. The process of claim 1, wherein selective derivatization is accomplished by introducing oxidant in the lower section of the reactor and introducing an oxidant consuming material in the upper section of the reactor.

14. The process of claim 13, wherein the oxidant consuming material is at least one selected from the group consisting of CO, $H_2$, coke, carbon, and metal sulfides.

* * * * *